United States Patent [19]
Dickerson

[11] 3,738,226
[45] June 12, 1973

[54] THREAD CUTTING ATTACHMENT FOR LATHES

[75] Inventor: Henry F. Dickerson, Oldsmar, Fla. 33557

[73] Assignee: Tampa Brass & Aluminum Corporation, Tampa, Fla. ; a part interest

[22] Filed: Nov. 20, 1970

[21] Appl. No.: 91,272

[52] U.S. Cl. .................................. 90/11.64, 51/259
[51] Int. Cl. ............................................. B23g 1/32
[58] Field of Search ................... 90/11 A, 11.64; 51/259

[56] References Cited
UNITED STATES PATENTS

| 3,104,505 | 9/1963 | Schohl | 51/259 |
|---|---|---|---|
| 2,776,604 | 1/1957 | Simsack | 51/259 |
| 2,453,020 | 11/1948 | Koett | 51/259 |
| 1,259,132 | 3/1918 | Ritz | 51/170 PT |
| 1,391,039 | 9/1921 | Beach | 51/259 |
| 1,501,681 | 7/1924 | Nielsen | 51/259 |

*Primary Examiner*—Harold D. Whitehead
*Attorney*—Stefan M. Stein and P. A. Orman et al.

[57] ABSTRACT

A thread cutting attachment for lathes mounted in the conventional tool holder carried by the longitudinal carriage of the lathe. The attachment includes a rotary cutter driven by an electric motor having a variable speed in a range of from 50 to 10,000 RPM. The attachment is adjustable about a horizontal pivot extending perpendicularly to the axis of the cutter so that the line of cut may be aligned with the pitch of the thread. Both internal and external threads are cut with the attachment by using the thread pitch drive on the lathe carriage.

10 Claims, 7 Drawing Figures

INVENTOR.
HENRY F. DICKERSON,
BY
Berman, Davidson & Berman,
ATTORNEYS.

PATENTED JUN 12 1973

INVENTOR.
HENRY F. DICKERSON,
BY
Berman, Davidson & Berman,
ATTORNEYS

THREAD CUTTING ATTACHMENT FOR LATHES

BACKGROUND OF THE INVENTION

FIELD OF THE INVENTION

The present invention relates to the cutting of external and internal precision threads on lathe turned work.

SUMMARY OF THE INVENTION

A precision thread cutting attachment is provided for attachment to a conventional tool holder carried by a carriage on a conventional metal cutting lathe. The thread cutting attachment includes a variable speed electric motor driven rotary cutter mounted for adjustment about a horizontal axis perpendicular to the longitudinally extending axis of the cutter. The adjustment of the cutter about the transverse pivot aligns the cutter with the pitch of the thread to be cut. The tool holder with the cutter secured thereto is moved by engaging the carriage with the desired pitch drive of the lathe.

The primary object of the invention is to provide a precision thread cutting attachment for lathes which can be used for cutting both internal and external threads with an extremely fine tolerance.

Other objects and advantages will become apparent in the following specification when considered in light of the attached drawings.

DESCRIPTION OF THE PREFERRED EMBODIMENT

Figure 1:
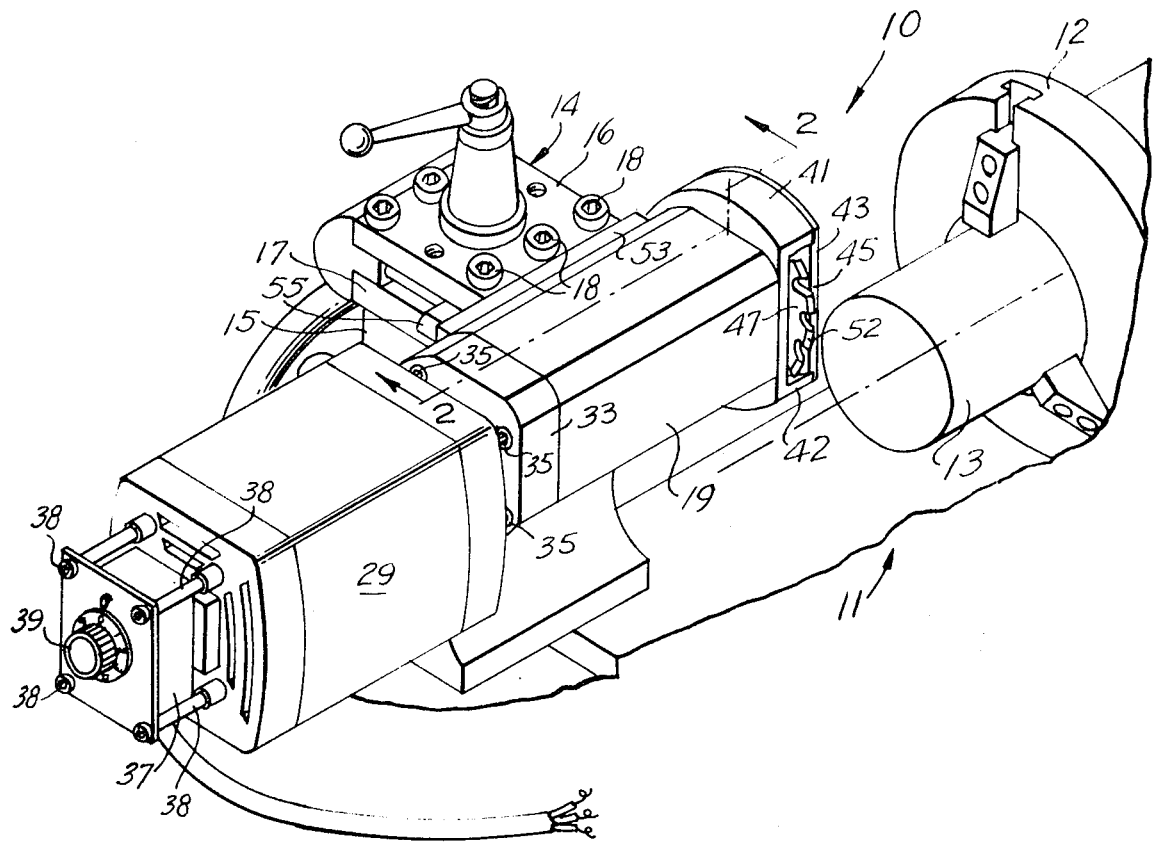
FIG. 1 is a perspective view of the invention shown attached to a conventional metal cutting lathe partially broken away for convenience of illustration.
Figure 2:
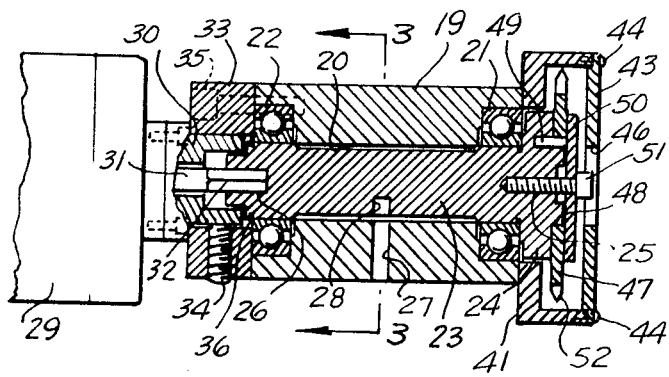
FIG. 2 is a fragmentary longitudinal sectional view taken along the line 2—2 of FIG. 1, looking in the direction of the arrows.

Referring now to the drawings in detail wherein like reference characters indicate like parts throughout the several figures the reference numeral 10 indicates generally a precision thread cutting attachment for lathes constructed in accordance with the invention.

The attachment 10 is adapted for use with a metal cutting lathe illustrated generally at 11 fragmentarily. The lathe 11 has a conventional chuck 12 which grips a piece of work 13 having a cylindrical shape and positioned for external threading. A conventional 4 post tool holder is indicated generally at 14 mounted on a longitudinally moveable carriage 15 which is adapted to be moved toward the work 13 when engaged with the desired thread pitch of the lathe in a conventional manner.

Figure 3:
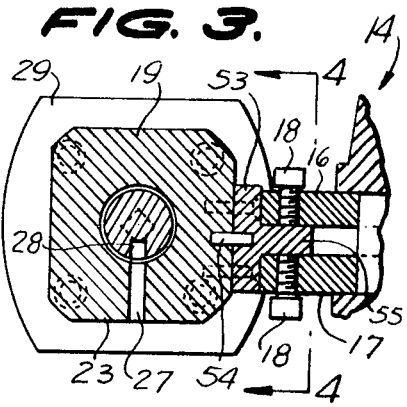
FIG. 3 is a transverse sectional view taken along the line 3—3 of FIG. 2, looking in the direction of the arrows.

The tool holder 14 includes an upper jaw 16 and a lower jaw 17 arranged in vertically spaced parallel relation as can be seen in FIG. 3. The jaws 16, 17 have a plurality of vertically extending clamping screws 18 arranged in opposed relation.

The attachment 10 includes a spindle housing 19 having an elongate bore 20 extending completely therethrough. A roller bearing 21 is mounted in a recess in one end of the spindle housing 19 and a roller bearing 22 is mounted in a recess in the other end of the spindle housing 19. A spindle 23 extends through the spindle housing 19 and is journalled in the bearings 21, 22 for rotation therein. The spindle 23 has an enlarged head 24 on its outer end. An axial threaded bore 25 opens into the outer end of the spindle 23 for reasons to be assigned. A square socket 26 opens into the inner end of the spindle 23 centrally thereof.

A bore 27 extends transversely through the spindle housing 19 and is adapted to align with a relatively short bore 28 opening into the side of the spindle 23 intermediate the opposite ends thereof. A pin (not shown) may be inserted through the bore 27 and into the bore 28 to lock the spindle 23 to the spindle housing 19 when changing cutters on the spindle 23.

An electric motor 29 has a hollow sleeve 30 extending from one end thereof surrounding the motor shaft 31 which projects therethrough and has a square extension 32 which is adapted to engage in the square socket 26 of the spindle 23. An adapter member 33 is engaged over the sleeve 30 and secured thereon by a set screw 34. The adapter 33 is secured to the inner end of the spindle housing 19 by a plurality of recess cap screws 35. The adapter 33 maintains the bearing 22 in the recess in the inner end of the spindle housing 19 and a retainer ring 36 engages in the inner end of the spindle 23 to secure the spindle 23 in the spindle housing 19.

A motor speed control adjustable rheostat 37 is secured to the outer end of the electric motor 29 by means of a plurality of bolts 38. A hand control knob 39 is mounted on the rheostat 37 for adjusting the speed of the motor 29 as required. The rheostat 37 is wired to the electric motor 29 in any conventional manner which will permit it to control the speed of the motor in a range of from 50 RPM to 10,000 RPM. An electric cord 40 extends from the rheostat 37 and motor 29 to a source of electricity (not shown).

A generally cup shaped guard 41 is secured to the outer end of the spindle housing 19 and has a relatively straight open side edge 42. A guard cover 43 is detachably secured to the guard 41 by a plurality of screws 44. The cover 43 is generally circular and has a straight side edge 45 which corresponds with the open side edge 42 of the guard 41. A central bore 46 opens through the cover 43 for reasons to be assigned.

A circular toothed cutter 47 is positioned on an annular shoulder 48 extending outwardly from the enlarged head 24. The cutter 47 engages against the head 24 and a drive pin 49 extends out of the head 24 parallel to the axis of spindle 23 and engages in the cutter 47 to prevent relative rotation between the cutter 47 and the spindle 23. A clamping washer 50 is engaged against the outer face of the cutter 47 and is secured thereto by a cap screw 51 which is threaded into the threaded bore 25. The cutter 47 has a diameter such that it projects through the open side 42 of the guard 41 to engage the work. The cutting edges 52 of the cutter 47 are uniformly beveled to a 60° included angle for most standard threading operations. It should be understood that the included angle 52 may be varied as required.

A T-bar 53 is engaged with the rear face of the spindle housing 19 on a pivot pin 54 which extends horizontally out of the spindle housing 19 perpendicularly to the axis of the spindle 23. The tongue 55 on the T-bar 53 engages between the upper jaw 16 and lower jaw 17 of the 4 post tool holder 14 and is clamped therein by the clamping screws 18. One end of the tongue 55 is formed into a pointer 56 which cooperates with an arcuate scale 57 on the spindle housing 19 to indicate the angular relationship between the T-bar 53 and the spindle housing 19.

A plurality of angular slots 58 open through the T-bar 53 toward the spindle housing 19 to receive a plurality of flathead recess clamping screws 59 which extend therethrough into the spindle housing 19. The clamping screws 59 secure the T-bar 53 to the spindle housing 19 and when loosened permit the T-bar 53 to be angularly adjusted with relation to the spindle housing 19.

Figure 7:
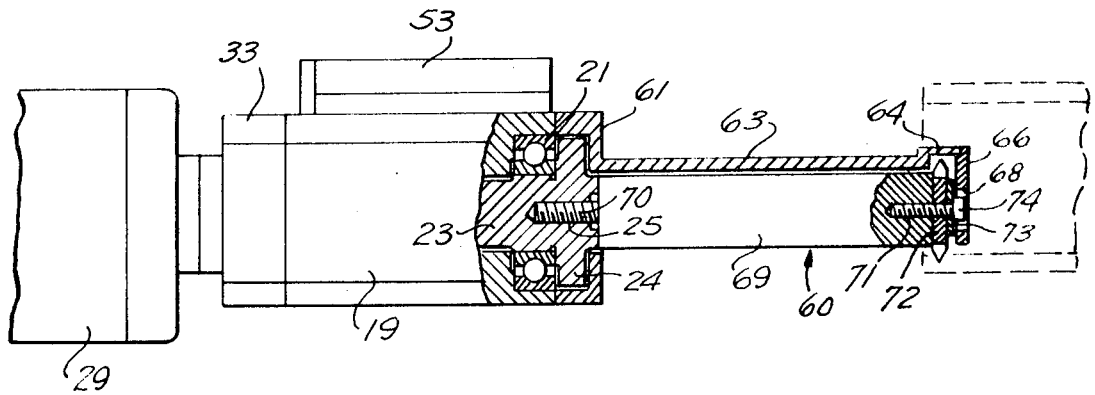
FIG. 7 is a fragmentary longitudinal sectional view taken along the line 7—7 of FIG. 6, looking in the direction of the arrows.
Figure 6:
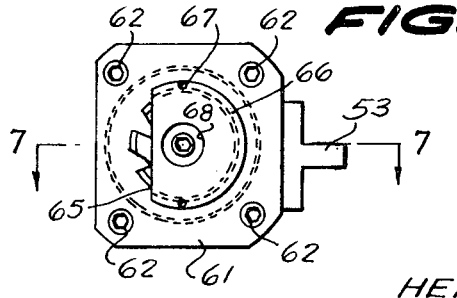
FIG. 6 is an end elevational view of the internal thread cutting adapter.

The structure illustrated in FIGS. 1 through 5 is used for cutting external threads on a cylindrical body and in FIGS. 6 and 7 an adapter is indicated generally at 60 for converting the attachment 10 for cutting interior threads. Prior to mounting the adapter 60, the cutter 47, guard 41, cover 43, washer 50 and cap screw 51 are all removed. A housing 61 is detachably secured to the spindle housing 19 with a plurality of screws 62. The housing 61 encloses the head 24 and has a semi-cylindrical extension 63 integrally formed thereon. A cup shaped guard 64 is integrally secured to the outer end of the extension 63 and has a open side 65. A cover 66 is detachably secured to the guard 64 and is detachably secured thereto with screws 67. The cover 66 has a central bore 68 for reasons to be assigned. A shaft 69 is axially aligned with the spindle 63 and is provided with a threaded extension 70 which engages in the threaded bore 25 of the spindle 23 so that the shaft 69 forms a rigid extension of the spindle 23. The shaft 69 has an axial threaded bore 71 opening into its outer end. A circular toothed cutter 72 is engaged against the outer end of the shaft 69 and a washer 73 engages against the cutter 72. A cap screw 74 extends through the washer 73 and clamps the cutter 72 against the end of the shaft 69.

The bore 46 in the cover 43 and the bore 68 in the cover 66 permits access respectively to the cap screws 51, 74 to permit the cutters 47, 72 to be changed without removing the guards 41, 64 respectively.

The cutter 72 has a beveled cutting edge with an included angle of 60° similar to the cutter 47. It should be understood that the cutter 72 may have any included angle desired.

In order to maintain the precision of the internally cut threads the diameter of the internal cutter should not exceed about one half the internal diameter of the work.

The speed of the electric motor 29 is varied by the rheostat 37 independently of the lathe speed. The speed of the electric motor 29 will be varied from 50 RPM to 10,000 RPM as required by the work diameter, work RPM, thread pitch, hardness of material being cut and the cutter diameter. If the cutter is rotated too fast for the conditions set forth above the cutter will be burned and precision work is not possible. Should the cutter turn too slow it will chatter and if the chatter is not corrected the cutter will be destroyed. The work being threaded should be rotated at the slowest speed setting available on the lathe being used to produce the highest quality of thread.

The mounting arrangement of the cutting attachment permits the attachment to be interchangably used in lathes from the small 9 inch swing size to the large 30 inch swing size without modification of the lathe structure.

Figure 4:
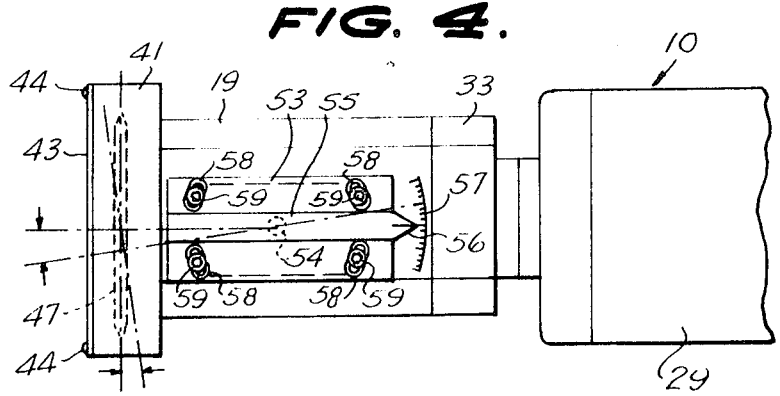
FIG. 4 is a rear elevational view of the invention removed from the tool holder.
Figure 5:
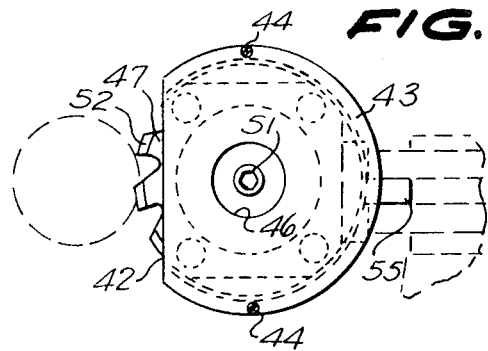
FIG. 5 is an end elevational view of the invention.

The mounting of the spindle housing 19 on the T-bar 53 permits an angular adjustment of the longitudinal axis of the spindle 23 so that the cutter 47 or the cutter 72 when using the adapter 60 can be arranged at an angle to the axis of the work corresponding to the angle of the pitch of the thread being cut. The dotted lines in FIG. 4 illustrate the swing of the T-bar 53 with respect to the spindle housing 19 to illustrate how the cutter 47 can be aligned with the angle of the thread pitch being cut.

In cutting threads with the attachment 10 one or more passes may be used to produce the final thread required.

While a toothed cutter has been illustrated for cutting the threads it should be understood that other cutting tools may be substituted therefor if desired.

In describing the lathe 11 a conventional 4 post tool holder 14 was illustrated, however, it should be understood that other tool holders such as a turret precision tool holder, or an adjustable tool holder as found on other metal cutting lathes may be used to support the attachment 10.

In using the present invention in both interior and exterior thread cutting operations it has been discovered that the chips tend to collect in the guards rather than lying in and about the threads being cut and interfering with the cutter teeth. The guard covers may be easily removed to discharge the chips collected therein.

Having thus described the preferred embodiments of the invention it should be understood that numerous structural modifications and adaptations may be resorted to without departing from the spirit of the invention.

What is claimed is:

1. A completely detachable, self-contained precision thread cutting attachment configured for use in combination with metal lathes having a rotating chuck and a carriage for supporting a tool holder thereon; said cutting attachment comprising a spindle housing, means to detachably secure said spindle housing to said tool holder including adjustment means for adjusting said attachment to said tool holder about a transverse pivot, said adjustment means comprises a horizontally disposed pivot pin extending outwardly from one side of said spindle housing, a T-bar member pivotally mounted on said pivot pin and means for securing said T-bar to said housing in angularly adjusted position with the cutting edge of said cutter aligned with the pitch of the thread being cut, said T-bar includes a horizontally disposed tongue portion secured to said tool holder and a cross-member extending vertically from the outer end of said tongue, said cross-member engaging the side of said spindle housing and said securing means including at least one aperture formed on said cross-member, said spindle housing including a corresponding aperture such that fastening means extends through said aperture formed on said cross-member and into said aperture formed on said spindle housing to fix said housing relative to said tool holder, an electric motor rigidly secured to said spindle housing by means of an adaptor member secured to the inner end of said spindle housing, said adaptor member operatively engaging a hollow sleeve extending from one end of said electric motor, said electric motor having a drive shaft extending from one end thereof within said hollow sleeve, a spindle secured in said spindle housing by a retaining means, said spindle being detachably connected to said drive shaft, said spindle including an enlarged head at its outer end to which is detachably secured a toothed circular cutter.

2. The attachment of claim 1 further including a scale on said housing and an indicator on said T-bar cooperating with said scale to indicate the angular adjustment of said housing relative to said T-bar.

3. The attachment of claim 1 further including an adapter means for converting said cutting attachment to cut interior threads, said adapter means comprising a housing detachably secured to the outer end of the said spindle housing enclosing said enlarged head, an extension integrally formed on said housing, said extension terminating in a guard member configured to at least partially enclose a toothed cutter and an extension shaft secured to said spindle, said cutter being secured to said extension shaft.

4. The attachment of claim 1 including a detachable guard attached to the outer end of said spindle housing and encloses at least a portion of said cutter.

5. The attachment of claim 4 wherein said detachable guard comprises a substantially cylindrical housing having an opening on one side thereof, at least a portion of said cutter projecting through said opening to engage the work.

6. The attachment of claim 5 wherein the outer end of said detachable guard includes an aperture to permit removal of said circular cutter through said aperture without removal of said detachable guard.

7. The attachment of claim 1 wherein said retaining means comprises a retaining ring engaging the inner end of said spindle to secure said spindle to spindle housing.

8. The attachment of claim 1 further including a drive pin extending out of said enlarged head of spindle to engage said circular cutter to prevent rotation of said circular cutter relative to said enlarged head.

9. The attachment of claim 3 wherein said guard member comprises a substantially cylindrical housing having an opening on one side thereof, at least a portion of said cutter projecting through said opening to engage the work.

10. The attachment of claim 9 wherein the outer end of said guard includes an aperture to permit removal of said circular cutter through said opening.

* * * * *